Patented Sept. 22, 1931

1,824,475

UNITED STATES PATENT OFFICE

MAX GERHARD FREISE, OF ANGERMUND, AND HERMANN MASCHMEYER, OF BAD EMS, GERMANY, ASSIGNORS TO BERZELIUS METALLHUETTEN-GESELLSCHAFT MIT BESCHRANKTER HAFTUNG, OF DUISBURG-MANHEIM, GERMANY, A CORPORATION OF GERMANY

PROCESS FOR SMELTING MATERIAL CONTAINING TIN OXIDE

No Drawing. Application filed February 19, 1930, Serial No. 429,815, and in Germany March 4, 1929.

This invention relates to a process for smelting material containing tin oxide.

It is known that tin ores (cassiterite), calcined tin oxides and all other oxidic products from which tin is recovered are extremely difficult to reduce, and that this circumstance is partly responsible for the difficulties and the extensive losses of tin in the metallurgical production of that metal.

In order to lessen the losses of tin, it has already been the practice to treat material, especially such as is low in tin—for example, containing less than 50% of the metal—by subjecting the powdered material to the action of solid, liquid or gaseous reducing agents, at temperatures at which no formation of slag occurred. The subsequent separation of the reduced tin from the fine-grained material nevertheless presented difficulties, a particular inconvenience being the ready tendency of the metallic tin to become re-oxidized. It is often difficult, and even impossible, during the after-treatment necessary for separating the metallic tin from the charge, to exclude all oxidizing influences from the stanniferous material. Moreover, the tin reduced out of the charge, without melting, oxidizes very readily, even at ordinary temperature, and the re-oxidation of the tin—which could not be prevented in the existing processes—is attended with considerable losses of metal.

The present invention aims at obviating this drawback. To this end, according to the invention, the tin is also converted into the metallic condition from the charge, by reduction treatment of the more or less finely divided material. This treatment is performed, for example, in a rotary furnace. Towards the end of the reduction, the temperature is, according to the invention, raised to such a degree that formation of slag occurs—for example, the process is conducted in such a way that the charge sinters. It has been found that the resulting slag envelops the metallic tin and thus protects it sufficiently from oxidizing influences. The heating may, however, be carried to such an extent as to form a pasty slag, in which the metallic tin is, so to speak, enclosed.

Substances, adapted for instance to facilitate the formation of slag may, of course, be added to the material before or during the reduction treatment.

The tin can be recovered from the slag by a great variety of methods, for example by melting down the material, with or without further additions. This operation can be performed in the rotary furnace itself, or in separate furnaces, such as shaft—or reverberatory furnaces. In the case of reverberatory furnaces, it is of particular advantage to keep them in rotational or reciprocating motion during the melting process, so that the tin can more readily collect and not remain suspended in the slag. Alternately, the material may be concentrated—after crushing, if desired—or the tin may be recovered therefrom by chemical or electrochemical means. If, for example in the case of rich stanniferous material, the tin content in the slag is still too high after the first working stage, the same may be subjected to after-treatment according to the process of the invention, or some other known process. The recovery of the tin may also be effected by subjecting to the herein described process, materials which have already been deprived of a portion of their tin content by some other process.

A related process for smelting tin oxide materials is described in application Serial No. 429,816 filed February 19, 1930.

Claim:—

A process for smelting materials containing tin oxide, which comprises treating the fine-grained material with solid, liquid or gaseous reducing agents, in a furnace of the rotary type, and towards the close of the reduction, raising the working temperature to such a degree as to produce a sintered, or a pasty, slag, which envelops the reduced tin and protects it from re-oxidation in the furnace itself and during the subsequent treatment in which the tin is separated from the non-metallic parts of the slag.

In testimony whereof, we affix our signatures.

MAX GERHARD FREISE.
HERMANN MASCHMEYER.